United States Patent
Hause et al.

(10) Patent No.: US 12,390,788 B1
(45) Date of Patent: Aug. 19, 2025

(54) METHOD FOR MANUFACTURING DOPED SORBENT COMPOSITIONS WITH ENHANCED LOADING CAPACITIES

(71) Applicant: Lithos Industries Inc., Fort Worth, TX (US)

(72) Inventors: Sarah Hause, Fort Worth, TX (US); Hood H. Whitson, Fort Worth, TX (US)

(73) Assignee: Lithos Industries Inc., Fort Worth, WA (US)

(*) Notice: Subject to any disclaimer, the term of this patent is extended or adjusted under 35 U.S.C. 154(b) by 0 days.

(21) Appl. No.: 18/619,139

(22) Filed: Mar. 27, 2024

(51) Int. Cl.
| B01J 20/04 | (2006.01) |
| B01J 20/30 | (2006.01) |
| B01J 23/00 | (2006.01) |
| B01J 23/04 | (2006.01) |
| B01J 23/34 | (2006.01) |

(52) U.S. Cl.
CPC ......... B01J 20/041 (2013.01); B01J 20/3078 (2013.01); *B01J 2220/42* (2013.01); *B01J 2220/4806* (2013.01)

(58) Field of Classification Search
CPC .... B01J 20/041; B01J 20/3078; B01J 23/005; B01J 23/04; B01J 23/34; B01J 2220/42; B01J 2220/4806
USPC .................................................. 502/324, 400
See application file for complete search history.

(56) References Cited

U.S. PATENT DOCUMENTS

| 11,260,366 B2 * | 3/2022 | Kudryavtsev | ........ B01J 20/3021 |
| 2022/0314195 A1 * | 10/2022 | Kölbel | ............... C01G 45/1221 |
| 2023/0338919 A1 * | 10/2023 | Alessi | ..................... B01J 20/041 |
| 2024/0001331 A1 * | 1/2024 | Jastrzebska | ........... B01J 20/3475 |

FOREIGN PATENT DOCUMENTS

| WO | WO-2021119841 A1 * | 6/2021 | ............ B01J 20/041 |
| WO | WO-2023225751 A1 * | 11/2023 | ............ B01D 15/362 |

* cited by examiner

*Primary Examiner* — Cam N. Nguyen
(74) *Attorney, Agent, or Firm* — Bryan A. Santarelli; FisherBroyles, LLP

(57) ABSTRACT

Embodiments of the present disclosure may include the synthesis of a doped sorbent spinel material, suitable for cost-effective and industrial-scale extraction of a metal from a metal-containing fluid. Embodiments of the present disclosure further include preparing a doped precursor blend followed by calcining the doped precursor blend for optimal duration and temperature to obtain a mass of intermediate-state sorbents having constituents synthesized at desired percentages. Some embodiments may also include cooling and milling the product obtained. The doped intermediate-state sorbents include desired proportions of $Mn_3O_4$, $Mn_2O_3$, and lithium manganese oxide (LMO). In some embodiments, the doped LMO may be activated with an acid treatment. Doped LMOs obtained by the method of the present disclosure result in an enhanced loading capacity compared to undoped LMOs formed under similar temperatures and durations.

12 Claims, 9 Drawing Sheets

|  | Doped Results | | | | Undoped Results | | | |
|---|---|---|---|---|---|---|---|---|
| Temp. in °C (5 hrs) | LMO (%) | $Mn_2O_3$ (%) | $Mn_3O_4$ (%) | $LiOH.H_2O$ (%) | LMO (%) | $Mn_2O_3$ (%) | $Mn_3O_4$ (%) | $LiOH.H_2O$ (%) |
| 400 | 15.63 | 0.76 | 81.66 | 1.95 | 11.51 | 6.98 | 77.41 | 4.11 |
| 450 | 11.26 | 14.2 | 74.54 | 0 | 7.08 | 12.81 | 78.07 | 2.04 |
| 500 | 70.58 | 2.33 | 26.41 | 0.68 | 90.62 | 9.04 | 0.34 | 0 |
| 525 | 88.79 | 10.78 | 0 | 0.43 | 94.42 | 5.58 | 0 | 0 |
| 550 | 80.13 | 19.37 | 0 | 0.50 | 82.6 | 17.4 | 0 | 0 |
| 600 | 88.04 | 11.96 | 0 | 0 | 72.2 | 23.98 | 2.21 | 1.62 |
| 650 | 89.78 | 10.22 | 0 | 0 | 74.34 | 25.66 | 0 | 0 |

Compound composition percentages of the intermediate-state sorbent of calcined doped and undoped precursor blend at different initial calcination temperatures for a duration of five (5) hours
All compound values represent the weight % phase composition as determined by Rietveld refinement of XRD data.

*FIG. 6*

| Time in Hours (525°C) | Doped Results | | | | Undoped Results | | | |
| --- | --- | --- | --- | --- | --- | --- | --- | --- |
| | LMO (%) | $Mn_2O_3$ (%) | $Mn_3O_4$ (%) | $LiOH.H_2O$ (%) | LMO | $Mn_2O_3$ | $Mn_3O_4$ | $LiOH.H_2O$ |
| 0.5 | 72.18 | 1.42 | 26.4 | 0 | 55.5 | 7.04 | 37.19 | 0.26 |
| 1 | 77.71 | 13.27 | 7.87 | 1.14 | 69.02 | 15.69 | 11.0 | 4.3 |
| 2 | 86.4 | 12.84 | 0.08 | 0.68 | 84.36 | 15.64 | 0 | 0 |
| 5 | 88.79 | 10.78 | 0 | 0.43 | 94.42 | 5.58 | 0 | 0 |
| 8 | 83.75 | 15.91 | 0.03 | 0.31 | 78.79 | 20.66 | 0.08 | 0.47 |
| 15 | 92.22 | 7.78 | 0 | 0 | 83.54 | 16.46 | 0 | 0 |

Compound composition percentages of the intermediate sorbents of calcined doped and undoped precursor blend at different calcination duration at 525°C All compound values represent the weight % phase composition as determined by Rietveld refinement of XRD data.

FIG. 7

| First Fire (°C) | Duration (Hrs) | Second Fire (°C) | Duration (Hrs) | Doped Results | | | | Undoped Results | | | |
|---|---|---|---|---|---|---|---|---|---|---|---|
| | | | | LMO (%) | $Mn_2O_3$ (%) | $Mn_3O_4$ (%) | $LiOH \cdot H_2O$ (%) | LMO (%) | $Mn_2O_3$ (%) | $Mn_3O_4$ (%) | $LiOH \cdot H_2O$ (%) |
| 400 | 5 | 525 | 10 | 52.66 | 46.35 | 0.33 | 0.66 | 76.59 | 23.41 | 0 | 0 |
| 525 | 0.5 | 525 | 0.5 | 85.39 | 7.93 | 4.58 | 2.09 | 63.32 | 25.68 | 10.37 | 0.64 |
| 525 | 0.5 | 525 | 10 | 100 | 0 | 0 | 0 | 83.24 | 16.67 | 0.06 | 0.02 |
| 525 | 2 | 525 | 2 | 92.29 | 7.04 | 0.67 | 0 | 79.89 | 19.42 | 0.49 | 0.21 |
| 525 | 2 | 525 | 10 | 100 | 0 | 0 | 0 | 89.82 | 8.92 | 1.26 | 0 |
| 525 | 5 | 525 | 10 | 95.43 | 3.31 | 0.94 | 0.33 | 91.38 | 8.09 | 0 | 0.53 |
| 525 | 15 | 525 | 10 | 99.48 | 0.2 | 0 | 0.31 | 92.23 | 7.16 | 0.33 | 0.28 |
| 650 | 5 | 525 | 10 | 99.33 | 0.42 | 0 | 0.25 | 92.09 | 7.76 | 0 | 0.15 |

Compound composition percentages of sorbents of calcined doped and undoped precursor blend during different second calcination temperatures and duration.

All compound composition values represent the weight % phase composition as determined by Rietveld refinement of XRD data.

*FIG. 8*

| No | Initial Calcination | | Second Calcination | | D | U |
| --- | --- | --- | --- | --- | --- | --- |
| | Temperature (in °C) | Duration (in Hours) | Temperature (in °C) | Duration (in Hours) | Loading Capacity (in mg/g LMO) | Loading Capacity (in mg/g LMO) |
| 1 | 525 | 0.5 | 525 | 0.5 | 13.3 | 10.2 |
| 2 | 525 | 2 | 525 | 2 | 16.2 | 13.2 |
| 3 | 525 | 5 | 525 | 10 | 18.6 | 15.9 |
| 4 | 525 | 15 | 525 | 10 | 19.8 | 14.5 |
| 5* | 525 | 5 | 525 | 10 | 24.1 | 23.9 |

Comparison of loading capacities of doped and undoped sorbent blend after initial and second calcination temperatures and durations All compound values represent the weight % phase composition as determined by Rietveld refinement of XRD data.

Experiments 1 – 4 use LiOH monohydrate as a lithium source for the reaction, while Experiment 5* uses $Li_2CO_3$.

*FIG. 9*

METHOD FOR MANUFACTURING DOPED SORBENT COMPOSITIONS WITH ENHANCED LOADING CAPACITIES

TECHNICAL FIELD

The subject matter herein relates, generally, to doped lithium manganese oxide (LMO) spinels for extracting a metal from a metal-containing fluid and, more particularly, to improvement and optimization techniques for manufacturing such compositions at commercial-scale volumes.

BRIEF SUMMARY

Embodiments of the present disclosure may include a doped sorbent spinel material obtained by a method including steps of obtaining reactants to form a doped precursor blend. Embodiments may also include reacting the precursor blend with a doping agent to form a doped precursor blend. Embodiments may also include calcining the doped precursor blend for an initial calcining duration and first temperature, forming a doped intermediate-state sorbent blend. Embodiments may also include cooling the doped intermediate-state sorbent blend. Embodiments may also include milling the doped intermediate-state sorbent blend.

Embodiments of the present disclosure may include a doped sorbent spinel material obtained by a method including steps of obtaining reactants and at least one doping agent to form a doped precursor blend. Embodiments of the present disclosure may also include calcining the doped precursor blend for an initial calcining duration and first calcining temperature, forming a doped intermediate-state sorbent blend. Embodiments may also include cooling the doped intermediate-state sorbent blend. Embodiments may also include milling the doped intermediate-state sorbent blend.

In some embodiments, the reactants include at least one high-grade manganese compound. In some embodiments, the manganese compound has a chemical formula of $Mn_3O_4$. In some embodiments, the reactants include at least $MnCO_3$, $Mn_2O_3$, and LiOH monohydrate or $Li_2CO_3$.

In some embodiments, the doping agent may include at least one of $Al(OH)_3$, $LiAlH_4$, $Co_3O_4$, $Cr_2O_3$, $Cr(OH)_3$, $Fe_2O_3$, $Fe_3O_4$, $Ni_2O_3$, $Ni(OH)_2$, NaCl, $AlCl_3$, $MgCO_3$, $Na_2CO_3$, NaOH, or $NaHCO_3$.

In some embodiments, the initial calcining duration may be at least five (5) hours and the first calcining temperature may be at least 525° C. In some embodiments, the intermediate-state sorbent blend may include at least 3.0% by weight $Mn_2O_3$ and 80% by weight LMO.

In some embodiments, the method may further include a second calcining event. In some embodiments of the present disclosure, the second calcining event may include a second calcining temperature of at least 525° C. In some embodiments of the present disclosure, the second calcining temperature is between 500° C. and 550° C. inclusive and the second calcining duration is approximately ten (10) hours. In some embodiments, the doped sorbent blend synthesized by the second calcining event may include at least 90% by weight of LMO and at least 3.0% by weight of $Mn_2O_3$, less than 1.0% of $Mn_3O_4$ and less than 1.0% of LiOH monohydrate. In some embodiments, the LMO of the doped sorbent blend has an activated-lithium loading capacity of at least 13.0 mg/g of activated LMO.

In some embodiments, the initial calcining duration is between two (2.0) and fifteen (15) hours and the first calcining temperature is at least 500° C. In some embodiments, the formed intermediate-state sorbent blend may include at least 70% by weight of LMO and at least 7% by weight $Mn_2O_3$. In some embodiments, the LMO of the doped sorbent blend has a lithium loading capacity of at least 13.0 mg/g of activated LMO.

In some embodiments, the initial calcining duration may be at least 0.5 hours and the first calcining temperature may be at least 525° C. In some embodiments, the intermediate-state sorbent blend may include at least 80% by weight doped LMO, at least 19.37% by weight $Mn_2O_3$. In some embodiments, the method may further include a second calcination duration of approximately thirty (30) minutes and the second calcining temperature is approximately 525° C. In some embodiments, the doped sorbent blend synthesized by the second calcining event may include at least 85% by weight of doped LMO, less than 8.0% by weight $Mn_2O_3$, less than 5.0% by weight $Mn_3O_4$, and less than 3.0% by weight LiOH monohydrate, wherein the LMO has a lithium loading capacity of at least 13.3 mg/g of activated LMO.

Embodiments of the present disclosure may also include a method for manufacturing a doped LMO sorbent spinel, the method including steps of obtaining a doped precursor blend. In some embodiments, the doped precursor blend may be one of a 3:4 molar ratio of lithium to manganese blend and a doping agent with a 0.3% molar replacement of the doping agent for manganese. In some embodiments of the present disclosure, the lithium source is LiOH monohydrate or $Li_2CO_3$ and the manganese source is a $Mn_3O_4$ precursor blend with a 0.3% molar replacement of the doping agent for manganese. Embodiments of the present disclosure may also include calcining the doped precursor blend for an initial calcining duration and at a first temperature of at least 500° C. Embodiments may also include an intermediate-state sorbent blend of at least $Mn_2O_3$ and a doped LMO formed by calcination. Embodiments may also include calcining the doped intermediate-state sorbent blend for a second calcining duration and second calcining temperature to form a doped sorbent blend.

In some embodiments, the initial calcining duration may be at least two (2) hours. In some embodiments, the first temperature may be at least 500° C. In some embodiments, the doped intermediate-state sorbent blend may include greater than 1% by weight $Mn_3O_4$, less than 13% by weight $Mn_2O_3$, and at least 86% by weight LMO.

In some embodiments, the initial calcining duration may be at least two (2) hours. In some embodiments, the initial calcining temperature may be at least 525° C. In some embodiments, the doped sorbent blend may include less than 1% by weight $Mn_3O_4$, less than 8% by weight $Mn_2O_3$, and at least 92% by weight LMO. In some embodiments, the LMO has a lithium loading capacity of at least 16.0 mg/g of activated LMO.

In some embodiments, the initial calcining duration may be at least five (5) hours. In some embodiments, the initial calcining temperature may be at least 525° C. In some embodiments, the formed intermediate-sorbent blend may include at least 75% by weight LMO and at least 5.5% by weight $Mn_2O_3$. In some embodiments, the second calcining duration may be at least five (5) hours and the second calcining temperature may be at least 525° C. In some embodiments, the doped sorbent blend may include less than 1.0% by weight $Mn_3O_4$, less than 4% by weight $Mn_2O_3$, and at least 95% by weight LMO. In some embodiments, the LMO has a lithium loading capacity of at least 18.0 mg/g of activated LMO.

In some embodiments, the method may include activating the doped sorbent blend, the activating includes mixing the doped sorbent with an acid. Embodiments may also include agitating the doped sorbent and the acid. Embodiments may also include activating the doped sorbent for a duration necessary to reach an activation percentage of at least 65% activation to form an activated doped sorbent.

Embodiments of the present disclosure may also include a method for manufacturing a doped activated LMO sorbent spinel, the method including steps of obtaining a doped precursor blend. In some embodiments, the doped precursor blend may be a 0.70 to 0.85 molar ratio of lithium to manganese. In some embodiments of the present disclosure, the lithium source is LiOH monohydrate or $Li_2CO_3$, and the manganese source is an $Mn_3O_4$ blend with a 0.3% molar replacement of the doping agent for manganese. Embodiments of the present disclosure may also include calcining the doped precursor blend for an initial calcining duration and at a first temperature of at least 525° C., forming a doped intermediate-sorbent blend. In some embodiments, the formed doped intermediate-sorbent blend may include at least $Mn_2O_3$ and a doped LMO. Embodiments may also include cooling the formed doped intermediate-sorbent blend. Embodiments may also include calcining the cooled intermediate-sorbent blend for a second calcining duration of at least five (5) hours and a second temperature of at least 500° C., forming a doped sorbent blend. Embodiments may also include activating the doped sorbent blend with an acid. In some embodiments, the activated doped sorbent blend may include at least one species of doped HMO sorbent spinel.

Embodiments may also include activating the doped sorbent blend with an acid. In some embodiments, the activated doped sorbent blend may include at least one species of hydrogen manganese oxide (HMO) sorbent spinel. Acid activation replaces lithium ions in the LMO structure with hydrogen ions, thus transforming LMO into HMO. The choice of acid and the conditions under which acid activation is performed sometimes must be sufficient to leach lithium ions from the LMO lattice without degrading the overall structure of the manganese-oxide matrix. During an activation that uses an acid treatment, hydrogen ions from the acid solution diffuse into the LMO structure, replacing lithium ions. This ion exchange process is facilitated by the porosity and reactive surface created through earlier steps of calcination and milling. In some embodiments, the use of a multi-proton acid, like $H_2SO_4$, may be desirable.

This acid activation results in the formation of a doped hydrogen-manganese-oxide (HMO) sorbent spinel. HMOs are known for their unique properties, such as high surface area and catalytic activity, making them suitable for various applications, including sorption and catalysis. The successful conversion of LMO to HMO via acid activation underscores the importance of carefully controlled process conditions to achieve the desired material transformation and properties.

In some embodiments, the doped intermediate-state sorbent blend may include less than 18% by weight $Mn_2O_3$ and at least 75% by weight LMO. In some embodiments, the LMO has a lithium loading capacity of at least 13.0 mg/g of activated doped LMO.

In some embodiments, the activated doped sorbent blend may include at least one species of doped HMO sorbent spinel having a lithium loading capacity of at least 24.0 mg/g of activated doped LMO.

BRIEF DESCRIPTION OF THE FIGURES

FIG. 6 is a table illustrating the compound percentages present within the intermediate-state sorbent blends of doped and undoped precursor blend at different initial calcination temperatures for five (5) hours as described in the method for manufacturing a doped LMO sorbent spinel from FIG. 2, according to some embodiments of the present disclosure.

FIG. 7 is a table illustrating the compound percentages present within the intermediate-state sorbents of calcined doped and undoped precursor blend obtained at a different calcination duration at 525° C. as described in the method for manufacturing a doped LMO sorbent spinel from FIG. 2, according to some embodiments of the present disclosure.

FIG. 8 is a table illustrating the compound percentages present within the sorbents synthesized using calcined doped and undoped precursor blends at various second calcination temperatures and durations as described in the method for manufacturing a doped LMO sorbent spinel from FIG. 5, according to some embodiments of the present disclosure.

FIG. 9 is a table illustrating the comparison of loading capacities of doped and undoped sorbent blend after initial and second calcination temperatures and durations as described in the method for manufacturing a doped LMO sorbent spinel from FIG. 5, according to some embodiments of the present disclosure.

DETAILED DESCRIPTION

Figure 1:
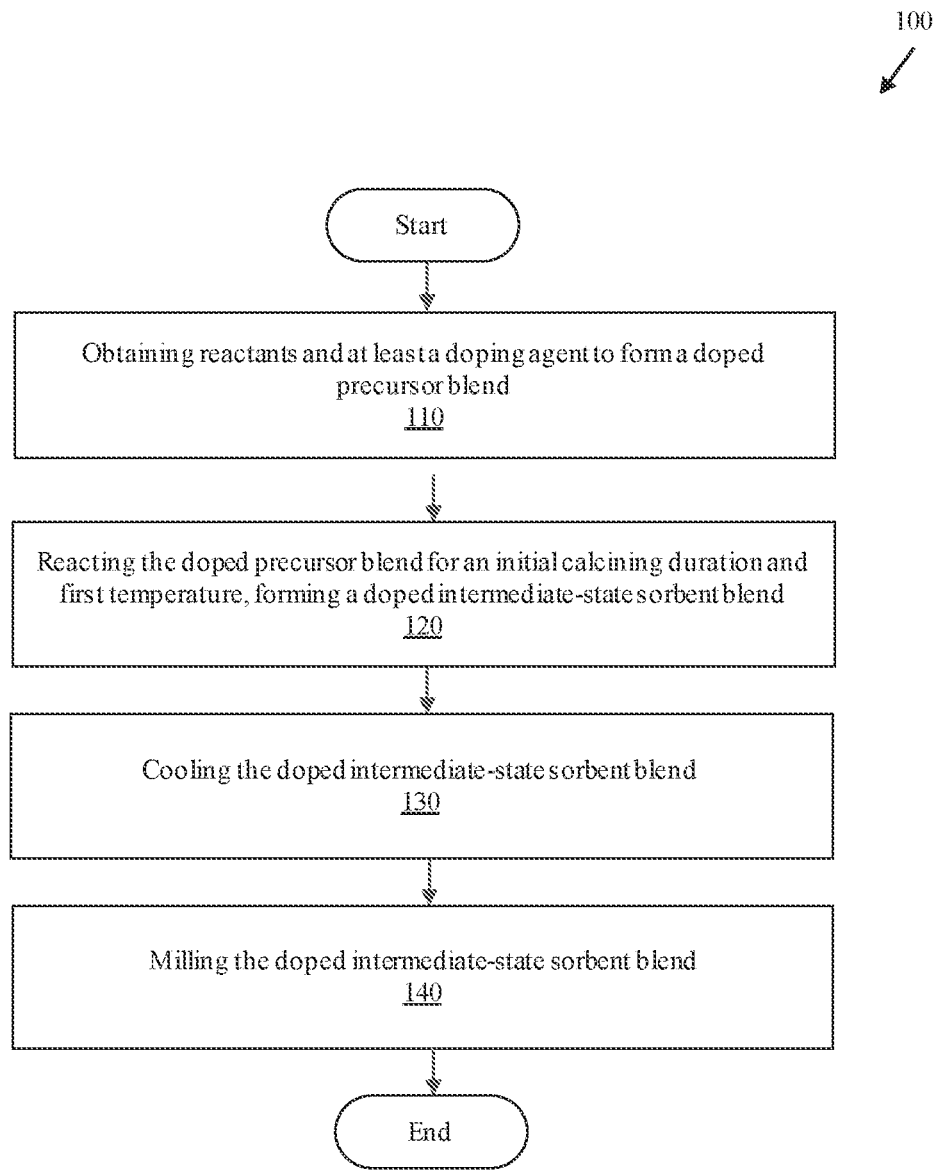
FIG. 1 is a flowchart illustrating a method according to some embodiments of the present disclosure.

Direct Lithium Extraction (DLE) often uses an activated Lithium Manganese Oxide (LMO) sorbent to remove lithium from produced water. While much research has been done exploring the use of LMOs to adsorb lithium at a lab scale, improvements in manufacturing LMOs at the scale required to process tens of thousands of gallons of water per hour are needed. An example of a DLE system that may be used to continuously or batch process a produced water at scale is described in U.S. provisional application No. 63/489,645, titled SYSTEM AND METHOD FOR REDUCING A CONCENTRATION OF A METAL FROM PRODUCED WATER USING A LARGE FORMAT COMPOSITION, filed on Mar. 10, 2023, PCT/US2024/019453, titled SORBENT-BASED SYSTEMS AND METHODS FOR REDUCING A CONCENTRATION OF A METAL FROM A FLUID, and U.S. patent application Ser. No. 18/601,896, titled SORBENT-BASED SYSTEMS AND METHODS FOR REDUCING A CONCENTRATION OF A METAL FROM A FLUID, the contents of which are incorporated in their entireties by reference, to the extent not inconsistent herewith. A factor in scaling up DLE systems to meet commercial demand is producing LMOs in bulk with the reactants that are presently available.

Conventional techniques for producing lab-scale quantities of LMO are described in Paulsen, J. M.; Dahn, J. R.; "Phase Diagram of Li—Mn—O Spinel in Air"; published by the American Chemical Society on Oct. 27, 1999 https:// cdn.bc-pf.org/olympiads/chemistry/rus sbory/2010-Oct/thermo.pdf, the contents of which are incorporated by reference in their entirety, to the extent not inconsistent herewith. Further, improving or optimizing synthesis techniques of a spinel sorbent, reacting durations and temperatures may be altered to enhance the purity and/or loading capacity of lithium manganese oxide (LMO) for various applications, including lithium-ion batteries, catalysis, and sorbents.

Spinel sorbents, such as LMOs, are important compounds in direct lithium extraction (DLE) systems. Some techniques for manufacturing these spinel sorbents are often described with respect to laboratory scale. When synthesizing larger volumes of sorbent spinels, such as a 15 to 20 kg batch size of LMO sorbent for treating 500 gallons of 30 PPM lithium produced water, using a lower grade of the doped precursor blend may be necessary. Lower-grade reactants may significantly impact the loading capacity of the sorbent, often reducing the loading capacity of the doped sorbent and impacting the fragility of the spinel structure and lattice integrities. Commercially available $Mn_3O_4$ may include compounds that impact the formation of an LMO, contributing to the ultimate loading capacity of the activated LMO and the quantity of LMO produced. Undesired compounds, such as iron (e.g., $Fe_2O_3$), vary in the amount present—in commercially available $Mn_3O_4$ sources (e.g., more-than-70% Mn sources will have a lower volume of iron (e.g., percent by weight of less than 0.7)). Similarly, the availability of Mn may vary by grade, such that higher grades of $Mn_3O_4$ may be available in % by weight more than or equal to 71% Mn of overall weight. The percentage of Mn and quality typically must be factored in, as in some DLE systems, it may be necessary to use between 12 kg and 20 kg of LMO with a 13 mg/g loading capacity to process 500 gallons of produced water containing a concentration of 30 mg/L of lithium.

Industrial batch-processing techniques benefit from higher-purity reactants that can be sourced in sufficient quantities and purities to synthesize a spinel sorbent. As batch sizes increase, and costs of reactants and reaction time and the associated costs of reacting the reactants increase, techniques typically must be developed for synthesizing spinel sorbents given the uncertain realities of today's supply chains and potentially limited availability of ideal reactants of relatively higher-grade reactants. For example, while sources of Mn from $Mn_2O_3$ and/or $Mn_3O_4$ are preferred, at times alternative forms, such as a manganese carbonate like $Mn_2CO_3$, may be used.

The present disclosure includes techniques for using commercially available reactants at higher temperatures to manufacture a high-loading-capacity LMO at scale. Such techniques may include transitioning a commercially available precursor to a doped precursor, and, in turn, to a doped intermediate state or a doped intermediate-state, sorbent blend at higher-range temperatures before converting the doped intermediate state to a doped sorbent blend. In some embodiments, the doped intermediates, $Mn_3O_4$ and $Mn_2O_3$ compounds, were synthesized by calcination for a duration. Transitioning a commercially available precursor to a doped intermediate-state sorbent blend may allow the reaction to be biased to produce a higher % composition of doped LMO product. Biasing the formation of specific constituents of the ultimate doped sorbent blend may be accomplished by varying the reactants within the doped precursor blend, varying the reaction modality (e.g., calcining), varying the reaction duration, varying the reaction conditions (such as the temperature or temperatures of the reaction), and increasing the number of reactions. In some embodiments, a reaction period is used to calculate the number of reactions. For example, a reaction period may begin with an initial reaction time, followed by a cooling duration and milling. A second reaction period may signify a second reaction period has been initiated.

In some embodiments, a doped intermediate state is beneficial when a reactant, such as an economical form of manganese oxide, such as $Mn_3O_4$, is converted to a doped intermediate-state reactant, such as $Mn_2O_3$. Some experimental results in which the reaction time was varied suggest that when calcining is stopped at defined intervals while the calcination temperature is held constant, the intermediate state $Mn_2O_3$ increases in quantity until the initial reactant $Mn_3O_4$ is no longer detectable using XRD. The evidence suggests that for a large amount of doped LMO to be synthesized from a relatively high-grade Mn source, it may be necessary for the Mn to transition to an intermediate state before the reaction with a lithium reagent, such as LiOH monohydrate, can proceed to form an LMO spinel. By adopting the techniques described in the present disclosure, manufacturers may be incentivized to produce manganese intermediate reactants, such as $Mn_2O_3$, in an intermediate state at volumes necessary for commercial scale.

Doping refers to introducing foreign elements into a material to modify its properties. In the context of lithium-manganese-oxide (LMO) spinels, doping can significantly impact the material's loading capacity. During the synthesis process, doping may aid in biasing production of LMO within intermediate-state sorbent blends and sorbent blends. In contrast to undoped LMOs, doped LMOs produced from the same initial reactants tend to have an enhanced loading capacity compared to their undoped counterpart LMOs.

In some embodiments, a commercially available manganese-oxide reactant may be included as one constituent of a precursor blend. As some manganese oxides may be converted to a necessary precursor reactant at temperatures described in the present disclosure, reacting a commercially available manganese oxide with a lithium donor can be advantageous in forming a precursor blend. Referring to FIG. 1, flowchart 100 describes a method according to some embodiments of the present disclosure. In some embodiments, at 110, the method may include obtaining reactants, such as $Mn_2O_3$ and LiOH monohydrate, to form a precursor blend, such as a doped precursor blend. To produce an LMO spinel at scale, a precursor blend may include at least one reactant that must be chemically changed before forming a doped LMO spinel. In some embodiments, reacting the doped precursor blend may include reacting the doped precursor blend at a high temperature and pressure to produce the doped intermediate-state sorbent. In some instances, reacting may include firing, a solid-state reaction such as calcination or calcining, microwave-assisted synthesis, mechanochemical synthesis, combustion synthesis, or rotary calcination.

The method may include obtaining reactants with a doping agent to form a doped precursor blend. After this step, the doped precursor blend is calcined for an initial duration and a first temperature, forming a doped intermediate-state sorbent blend at step 120. A doped intermediate-state sorbent blend may be reacted to form a desirable intermediate state between a pure precursor blend of reactants and an end state of a doped sorbent blend. The reaction may be biased to alter the compound constituents present, the relative quantities of the chemical constituents, the chemical properties of the chemical constituents, or any combination thereof. The doped precursor blend at 120 is a mix of lithium and manganese oxide blended along with a doping agent, wherein the manganese-oxide blend is an initial chemical formula, the doped intermediate-state sorbent may include a reduced volume of at least one reactant, a reactant at a second state, and some doped LMO. For illustrative purposes, a doped precursor blend may include a 3:4 molar ratio of lithium to manganese blend and a doping agent with a 0.3% molar replacement of the doping agent for manganese, where the manganese reactant being $Mn_3O_4$ is the first state.

The doped precursor blend is reacted with a doping agent at step 120 is any one of a 3:4, a 4:5, or a 0.70-0.85 molar ratio of lithium to manganese blend and a doping agent with a specified molar replacement of the doping agent for manganese. For example, the doping agent is at least one of $Al(OH)_3$, $Co_3O_4$, $Cr_2O_3$, $Cr(OH)_3$, $Fe_2O_3$, $Fe_3O_4$, $Ni_2O_3$, $Ni(OH)_2$, NaCl, $AlCl_3$, $MgCO_3$, $Na_2CO_3$, NaOH, $NaHCO_3$ or an aluminum-based compound. In some embodiments, the precursor blend may be doped with at least one cation. In some embodiments, the cation may be $Na^+$, $Mg^{2+}$, $Sn^{2+}$, $Zn^{2+}$, $Al^{3+}$, $Cr^{3+}$, $Sn^{4+}$, $Zr^{4+}$, $Ru^{4+}$, $V^{5+}$, $Nb^{5+}$, or the like. In some embodiments, the precursor blend may be an aluminate sorbent such as a lithium-aluminum-layered double-hydroxide-chloride (LDH) sorbent such as $Li_x \cdot Al_2(OH)_6Cl_x nH_2O$, where the variable x represents the Li and Cl stoichiometry, and n represents the moles of interlayer water. The aluminate sorbent may be a layered double hydroxide (LDH) in some embodiments. In some embodiments, the aluminate sorbent may be doped. In some embodiments, the doped aluminate sorbent may be LiCl: $Al_{1.25}Fe_{0.25}(OH)_3$, referred to as "Fe Doped LDH," and related compounds. In some embodiments, the initial calcining duration is the time under temperature and does not necessarily account for the ramp-up period to achieve temperature or the ramp-down period to achieve a cool-down temperature.

In some embodiments, the doping agent used is a nickel-based compound. In other preferred embodiments, the doping agent used is an aluminum-based compound. The concentration of doping agents and their distribution within the LMO spinel can significantly influence crystal structure and, therefore, the loading capacity.

In some embodiments, step 120 comprises a doping agent with a 0.3% specified molar replacement of the doping agent for manganese. The doped precursor blend may include any number of doping agents to achieve the desired molar replacement of the doping agent for manganese in the LMO. In some embodiments in which a 3:4, a 4:5, or a 0.70-0.85 molar ratio of lithium to manganese blend is used, and an aluminum compound serves as the basis for the doping agent, data indicates a 0.3% specified molar replacement of the doping agent for manganese may enhance the loading capacity of the doped LMO over the synthesis of an undoped LMO that otherwise uses the same reactants, calcination durations, and temperatures. While 0.3% specified molar replacement of the doping agent for manganese has been described, the specified molar replacement of aluminum for manganese may be varied to between 0.1% to approximately 1% molar replacement. While aluminum has been specified, non-limiting examples of doping agents may include one or more of $Al(OH)_3$, $Co_3O_4$, $Cr_2O_3$, $Cr(OH)_3$, $Fe_2O_3$, $Fe_3O_4$, $Ni_2O_3$, $Ni(OH)_2$, NaCl, $AlCl_3$, $MgCO_3$, $Na_2CO_3$, NaOH, $NaHCO_3$, or an aluminum-based compound. Varying the doping agent, varying the reactants, and varying the duration, temperature, and the number of calcination periods may suggest the use of a higher or lower specified molar replacement.

Subsequently, calcining any one of a 3:4, a 4:5 or a 0.70-0.85 molar ratio of lithium-and-manganese blend and the doping agent with a 0.3% molar replacement of the doping agent for manganese for an initial duration of five (5) hours at 525° C., a doped intermediate-state sorbent blend may include 88% by weight LMO, 10% by weight $Mn_2O_3$ (a second state reactant of the $Mn_3O_4$ first reactant state), and less than 1% of LiOH monohydrate. Testing the volumes of the chemical constituents of the doped intermediate-state sorbent blend may be accomplished using X-ray Diffractometer (XRD) equipment, such as the Rigaku Benchtop X-ray Diffractometer MiniFlex600.

At 130, the method may include cooling the doped intermediate-state sorbent blend. Cooling may be beneficial in some commercial settings to safely handle the intermediate-state sorbent blend. At 140, the method may include milling the doped intermediate-state sorbent blend. In some embodiments, the reacting, such as when calcining techniques are used, results in the agglomeration of the doped intermediate-state sorbent blend. In such instances, it may be beneficial to cool the doped intermediate-state sorbent blend and mill the blend to a size that is readily retained within a batch or continuous processing DLE system. For example, the doped intermediate-state sorbent may be milled such that the size of the doped intermediate-state sorbent exceeds the pore size of membrane-based DLE systems such that the doped intermediate-state sorbent may be retained within the DLE system.

In some embodiments, the reactants may include at least one manganese compound. For example, the reactants may include at least one of $MnO_2$, $Mn_3O_4$, $Mn(NO_3)_2$, $MnCO_3$, or $Mn_2O_3$. In some embodiments, the reactants may include at least one of lithium hydroxide, lithium carbonate, and at least one of $Mn_3O_4$, $MnCO_3$, and $Mn_2O_3$. The manganese compound may have a chemical formula of $Mn_3O_4$. In some embodiments, the intermediate-state sorbent blend further comprises at least 83% by weight LMO and 3% by weight $Mn_2O_3$. In some embodiments, the reactants may include $Mn_2O_3$ and LiOH. In some embodiments, the initial calcining duration may be at least five (5) hours, and the first temperature may be at least 500° C. The LMO may have a lithium loading capacity of at least 16.0 mg/g of LMO.

In some embodiments, the doped intermediate-state sorbent blend further comprises at least 26% by weight $Mn_3O_4$, 2.0% by weight $Mn_2O_3$, and 70% by weight a doped LMO. In some embodiments, the initial calcining duration may be at least five (5) hours, and the first temperature may be at least 600° C. In some embodiments, the intermediate-state sorbent blend further comprises less than 14.0% by weight $Mn_2O_3$, and 88% by weight a doped LMO. In some embodiments, the intermediate-state sorbent blend further comprises at least 10.0% by weight $Mn_2O_3$, and 89% by weight a doped LMO.

Figure 2:
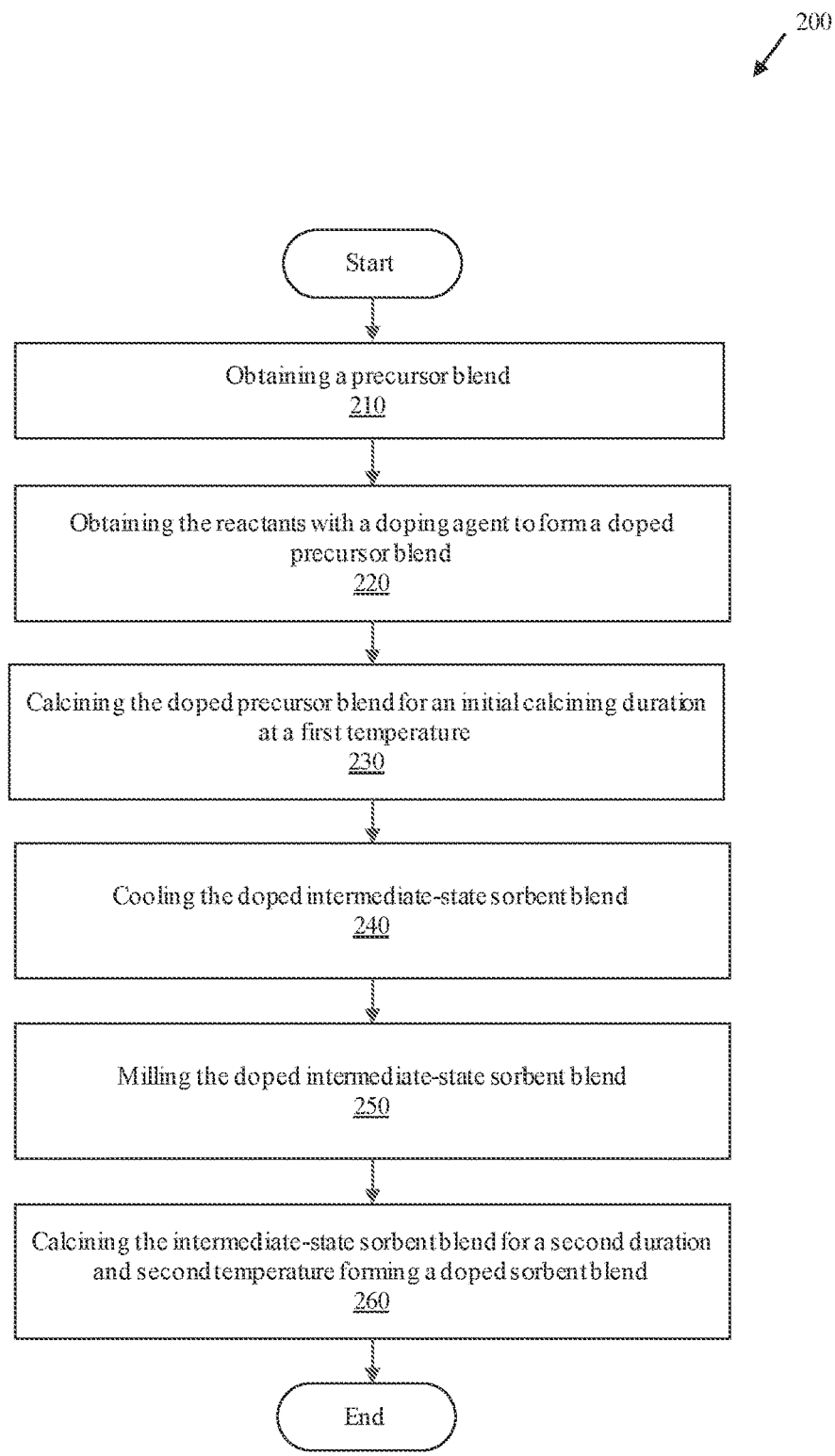
FIG. 2 is a flowchart illustrating a method for manufacturing a doped LMO sorbent spinel according to some embodiments of the present disclosure.

FIG. 2 is a flowchart that describes a method for manufacturing a doped LMO sorbent spinel, according to some embodiments of the present disclosure. In some embodiments, at 210, the method may include obtaining a precursor blend. A doped precursor blend may include reactants that are necessary for producing one or more reactions that have taken place. While the present disclosure describes the formation of lithium manganese oxides (LMOs), the present techniques also apply to other metal-oxide sorbents, such as lithium-ion sieve (LIS) and uncoated sorbents like titanate sorbents. In some embodiments, the doped precursor blend may be one of a 3:4, a 4:5, and a 0.70 to 0.85 molar ratio of lithium-to-manganese blend with a 0.3% molar replacement of the doping agent for manganese to form a doped precursor blend.

At step 220, the method may include obtaining the doped precursor blend with a doping agent in any one of a 3:4, a 4:5 or a 0.70-0.85 molar ratio of lithium to manganese with a 0.3% molar replacement of the doping agent for manganese to form a doped precursor blend. Doping agents may help in stabilizing the crystal lattice of the LMO without altering the crystal structure. In preferred embodiments, the doping agent includes a nickel-based compound. In other preferred embodiments, the doping agent is an aluminum-based compound. At step 230, the method may include calcining as a means for reacting the doped precursor blend. In some embodiments, the step may include calcining the doped precursor blend for an initial calcining duration and at a first temperature. Calcining durations may be altered to bias the production of specific constituents within specific quantity ranges. In one embodiment, the calcining duration may be biased to produce an LMO of at least 88% phase composition as measured with XRD data, at least 10% intermediate-state product (e.g., $Mn_2O_3$), and ideally, an undetectable amount of reactant from the doped precursor blend. To synthesize the intermediate-state sorbent blend with the biased-doped intermediate-sorbent constituents, a calcining temperature of at least 500° C. and a minimum reaction duration of approximately five (5) hours is performed.

In some embodiments, at 240, the method may include cooling the doped intermediate-state sorbent blend. Cooling the doped sorbent may be useful when handling the doped intermediate-sorbent blend at the reaction temperature is impractical or does not comply with manufacturing safety protocols. The cooled or cooling doped intermediate-state sorbent blend at 250, may include additional steps. In some embodiments, for example the synthesis of an LMO, may involve performing additional steps like milling an agglomerated intermediate-state sorbent blend. When additional refinement to the doped precursor blend is not desired, milling may be performed to support the measuring the doped sorbent-blend for packaging and sale or for activation prior to use in a DLE system.

In some embodiments, it may be desirable to further purify or otherwise increase the percent phase composition of a desired product, such as the LMO. When a doped precursor blend of relatively high quality is used in the first reaction, a second reaction event can be performed to reduce an intermediate-state product like $Mn_2O_3$ and bias the reaction to produce a higher percentage of doped LMO. At 260, the method may include calcining the doped intermediate-state sorbent blend for a second duration and the second temperature, forming a sorbent blend such as a doped sorbent blend. The calcining may form a doped intermediate-state sorbent blend of at least $Mn_2O_3$ and a doped LMO. The lithium loading capacity of the doped LMO may vary based on the temperature used during the first and second reaction. When calcining is performed, generally lower calcining temperatures of approximately 425° C. tend to produce doped LMOs with a lower loading capacity. In some embodiments, air may be pumped into a kiln during the calcination. When the air is not pre-heated to the kiln temperature, the added air may result in a lower loading capacity LMO.

Referring to Table 1, two (2) multiple-step reactions were conducted consistent with the process of FIG. 2. A doped precursor blend of $LiOH \cdot H_2O$ and $Mn_3O_4$ was mixed in a 3:4 molar ratio of lithium to manganese blend and a doping agent with a 0.3% molar replacement of the doping agent for manganese. The doped precursor blend is subjected to doping with a doping agent, preferably a nickel-based compound or an aluminum-based compound, in any one of a 3:4, a 4:5 or a 0.70-0.85 molar ratio in an approximately 0.3% molar equivalent substitution of the dopant ion for Mn. In each reaction (i.e., React. 1 and React. 2), the reaction duration was held constant at five (5) hours, while the temperatures of each reaction were held at approximately 425° C. and 525° C. To elaborate on the temperature improved or optimized, it has been observed that once 525° C. is hit, higher temperatures do not appear to have a significant impact on the weight of LMO produced. For temperatures at 525° C., it appears that as duration of the first calcining increases, loading capacity increases for the activated sorbent.

In some instances, unheated air was pumped into the kiln. The doped intermediate-state sorbent blend was analyzed using XRD, with the results and loading capacity of the isolated doped LMO provided below.

TABLE 1

First and Second Calcination results with and without air using a higher-grade doped precursor blend.

| No. | Air | React. 1 | React. 2 | React 2 Duration | Loading (mg/g) | $Mn_2O_3$ | LMO |
|---|---|---|---|---|---|---|---|
| 1 | Y | 425 | 500 | 5 | 7.2 | 38.2 | 61.7 |
| 2 | N | 525 | 525 | 10 | 17.6 | 0.2 | 99.8 |
| 3 | Y | 525 | 525 | 10 | 15.6 | 1.5 | 98.5 |
| 4 | Y | 525 | 525 | 10 | 17.8 | 0.2 | 99.8 |

As mentioned in Table 1 and seen in FIG. 2, varying the reaction parameters of temperature and duration can bias the constituents present within and the percentage of the constituents within the synthesized doped sorbent blend. When the grade of the reactants forming the doped precursor blend is of a higher grade, the constituents of the doped sorbent blend are more reliably predicted. Lower-quality reactant sources often include compounds containing P, Fe, and CaO in percent by mass as high as 0.71%, 2.70%, and 0.46%, respectively. When the presence of these undesired compounds are reduced (e.g. iron reduced to approximately 0.20%) or even eliminated, they may yield consistently higher percentages of desired doped intermediate-state compounds like doped LMO and $Mn_2O_3$. In some embodiments, the initial calcining duration may be set to at least five (5) hours. In some embodiments, the initial calcining duration may be at least five (5) hours, and the first temperature may be at least 500° C. In some embodiments, the doped intermediate-state sorbent blend further comprises at least 88% by weight of LMO, less than 1% of LiOH monohydrate, and at least 10% by weight $Mn_2O_3$. In some embodiments, the doped intermediate-state sorbent blend further comprises less than 1% by weight $Mn_3O_4$, at least 10% by weight $Mn_2O_3$, at least 85% by weight of LMO, and less than 1% of LiOH monohydrate. The doped LMO may have a lithium loading capacity of at least 16.0 mg/g of LMO. In some embodiments, the initial calcining duration may be at least fifteen (15) hours and the first temperature may be at least 525° C. and the doped intermediate-state sorbent blend further comprises at least 7.0% by weight $Mn_2O_3$, and 90% by weight of LMO.

Further, Table 1 characterizes the impact of temperature, air flow, and reaction duration for biasing the synthesis of doped LMO and $Mn_2O_3$ of desired percentages of purity. To obtain a doped LMO of at least 60% with a loading capacity of at least 7 mg/g using higher quality reactants, the doped precursor blend typically should be doped with a doping agent and the resulting doped precursor blend is calcined for an initial calcining temperature of 425° C. and a second calcining temperature of 500° C. for a duration of at least five (5) hours in the presence of air. To obtain a doped LMO of approximately 99% purity with a loading capacity of at least 17 mg/g, the doped precursor blend typically should be calcined for an initial calcining temperature of 525° C. and duration of 5 hours, followed by a second calcining temperature of 525° C. and a duration of at least ten (10) hours, with or without forced air pumped into the kiln. To bias the synthesis of an LMO to approximately 98% purity with a loading capacity of at least 15 mg/g within the doped intermediate-state sorbent, the doped precursor blend should be doped and calcined for an initial calcining temperature of approximately 525° C. and duration of five (5) hours, followed by a second calcining temperature of at least 525° C., for a duration of at least ten (10) hours in the presence of forced air.

Figure 3:
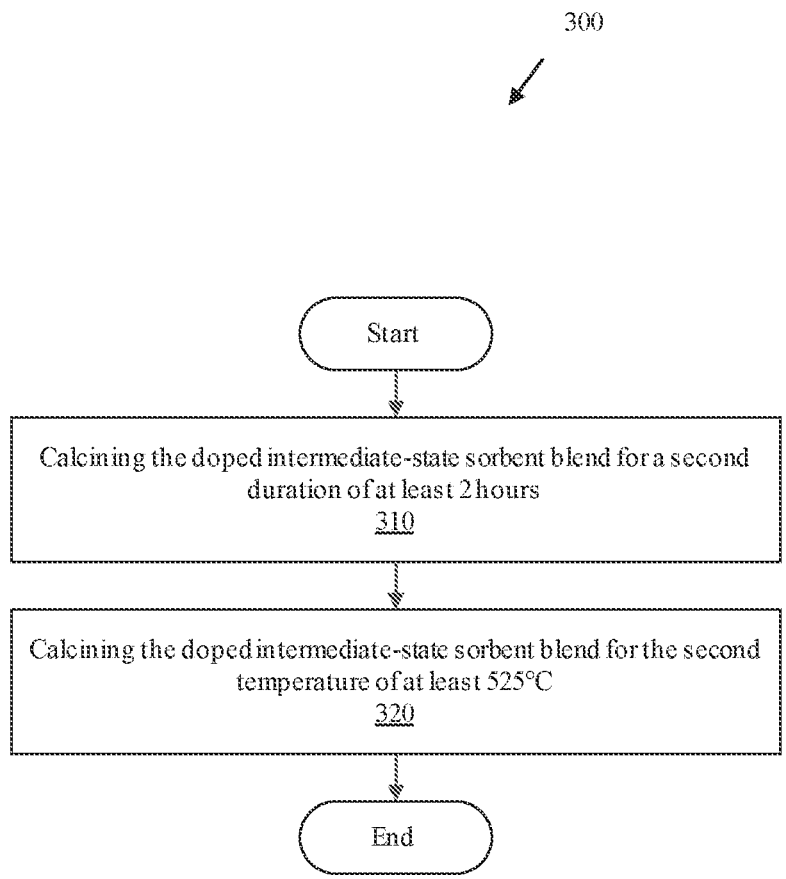
FIG. 3 is a flowchart further illustrating the method for manufacturing a doped LMO sorbent spinel from FIG. 2, according to some embodiments of the present disclosure.

FIG. 3 is a flowchart that further describes the method for manufacturing a doped LMO sorbent spinel based on principles described in relation to FIG. 2, according to some embodiments of the present disclosure. In some embodiments, the calcining of the doped intermediate-state sorbent blend for a second duration and a second temperature may include steps 310 to 320. In some embodiments, the calcination duration may be set to a period of between two (2) hours, as in 310, to as many as fifteen (15) hours. To demonstrate the variability of the process to bias the formation of specific compound constituents and their quantities within the doped sorbent blend, step 320 may be modified by selecting a temperature that is the same or different from the initial reaction temperature used in the first calcination. For example, in some embodiments, the first five (5) hour calcination at 650° C. is followed by a second ten (10) hour calcination at 525° C. The resultant doped sorbent may blend is biased to produce at least 75% by weight LMO. When activated, the resulting doped HMO may have a lithium loading capacity of at least 13.0 mg/g of activated LMO.

Figure 4:
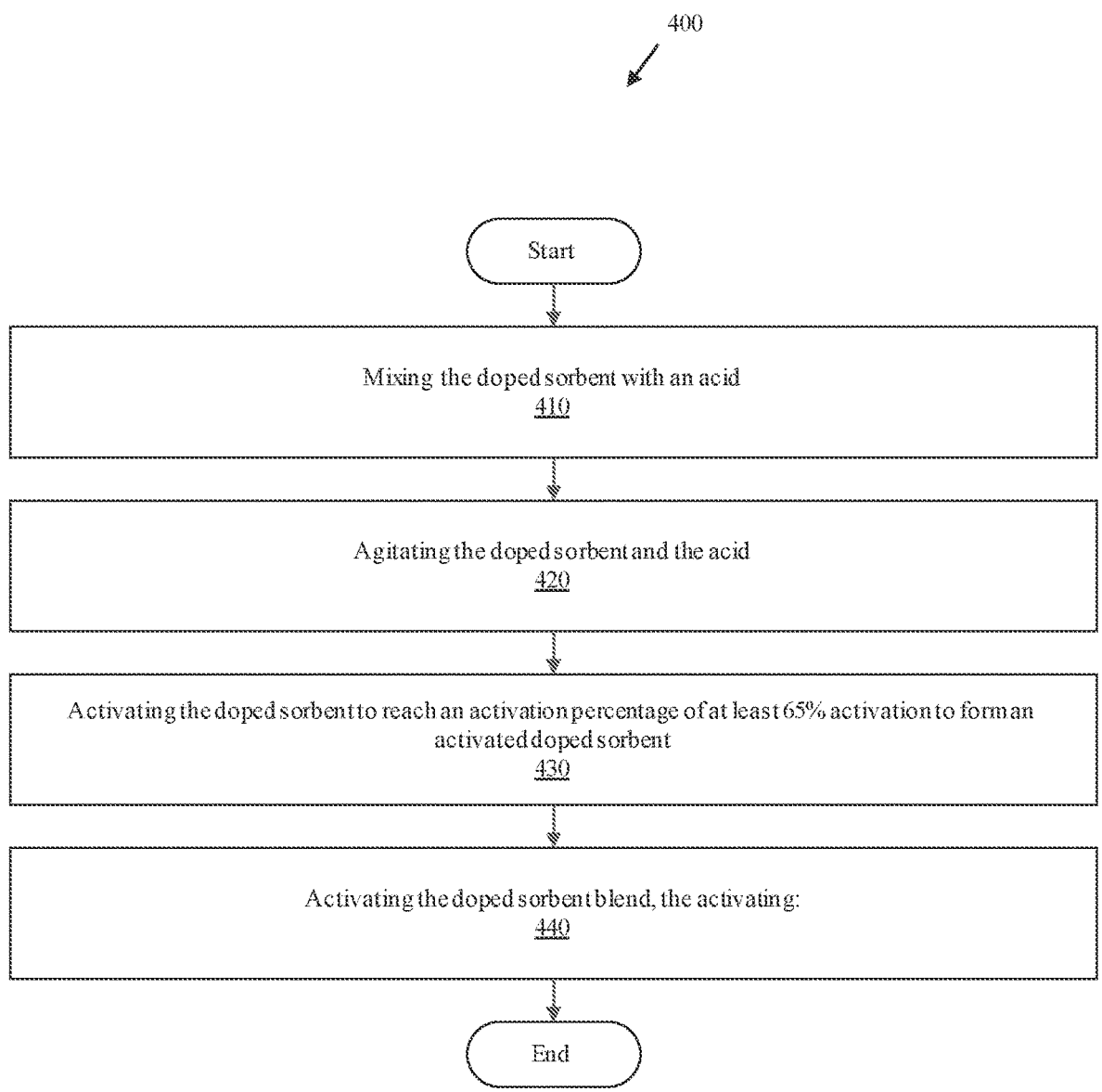
FIG. 4 is a flowchart further illustrating the method for manufacturing a doped LMO sorbent spinel from FIG. 2, according to some embodiments of the present disclosure.

FIG. 4 is a flowchart that further describes the method for manufacturing a doped LMO sorbent spinel from FIG. 2, according to some embodiments of the present disclosure. In some embodiments, at 440, the method may include activating the doped sorbent blend. Activating the doped LMO often involves preparing an HMO by displacing the lithium within the LMO structure with an alternative ionic element, such as hydrogen. In general, an activated LMO may be an HMO. In some embodiments, at 410, the activating may include mixing the doped spinel sorbent with an acid. In some embodiments, the acid may be a single-proton donor, such as HCl, or may be a multi-proton donor such as $H_2SO_4$. In some embodiments, the doped spinel sorbent, such as an LMO, may be activated using a ratio of 1 g of LMO per 45 mL of an acid. At 420, the activating may include agitating the doped sorbent. Agitating the doped sorbent may accelerate the activation step, and the mechanism for agitating the mix may be selected to reduce the damage done to the doped spinel structure. The doped spinel sorbent and the acid may be placed in contact for between sixteen (16) to forty-eight (48) hours. In some embodiments, doped spinel sorbent and the acid may be agitated during contact time, reducing contact time to less than sixteen (16) hours. Since rough handling of the doped sorbent may degrade the spinel structure of the LMO, careful management of the process coupled with active monitoring of the turbidity may be factored in to improve or to optimize the contact time duration while reducing or minimizing doped-spinel-structure degradation. In some embodiments, the mixture of acid and doped spinel sorbent may be allowed to reach equilibrium without an agitation mechanism. The duration may be altered to achieve a certain amount of activation. For example, in some embodiments, at 430, the activating may include activating the doped sorbent to reach an activation percentage of at least 65% activation to form an activated sorbent.

Figure 5:
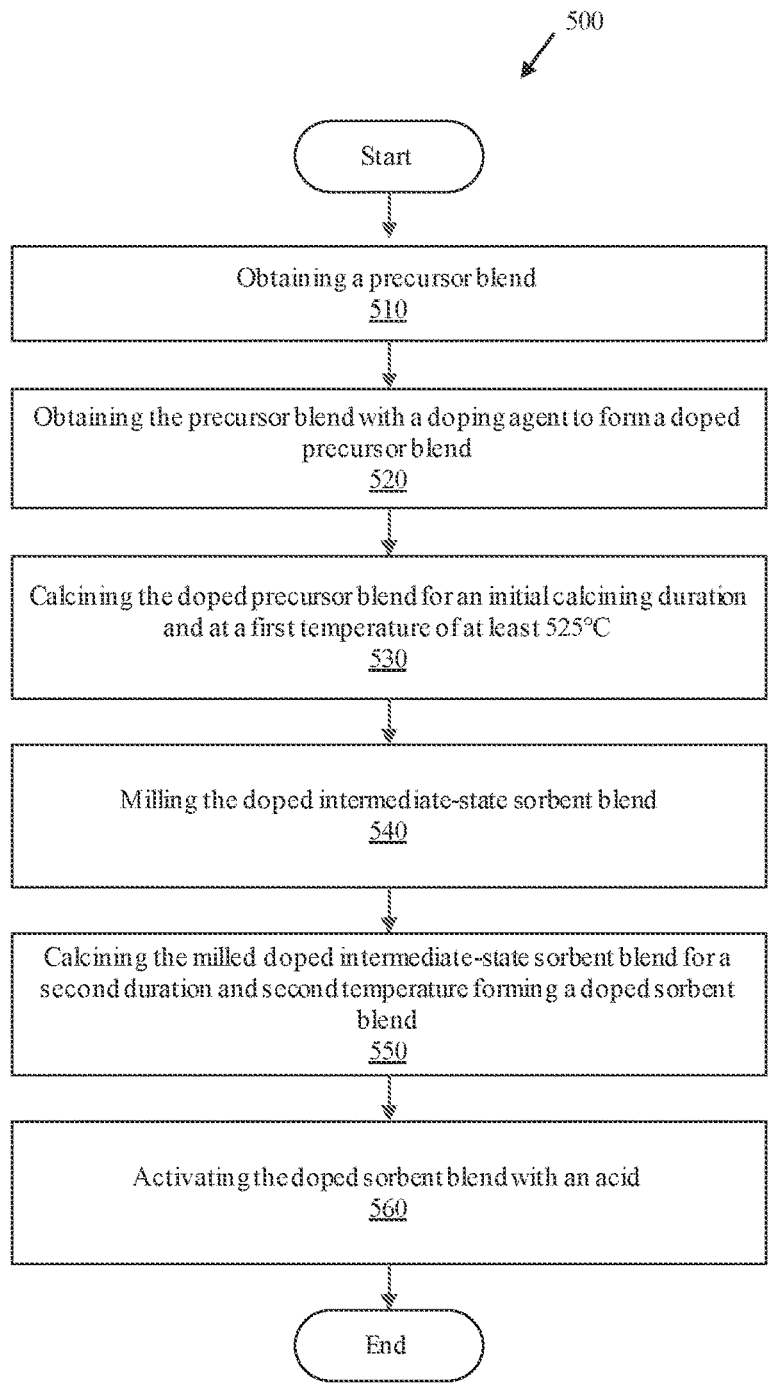
FIG. 5 is a flowchart illustrating a method for manufacturing a doped activated LMO sorbent spinel, according to some embodiments of the present disclosure.

FIG. 5 is a flowchart that describes a method for manufacturing a doped activated LMO sorbent spinel, according to some embodiments of the present disclosure. In some embodiments, at 510, the method may include obtaining a precursor blend. At 520, the method may include obtaining the precursor blend with a doping agent to form a doped precursor blend. At 530, the method may include calcining the doped precursor blend for an initial calcining duration and at a first temperature of at least 525° C. At 540, the method may include milling the doped intermediate-state sorbent blend. At 550, the method may include calcining the milled doped intermediate-state sorbent blend for a second duration and the second temperature, forming a sorbent blend, for example a doped sorbent blend. At 560, the method may include activating the sorbent blend (e.g., doped sorbent blend) with an acid.

In some embodiments, the purity and loading capacity of lithium manganese oxide (LMO) can be influenced by various factors, including the synthesis techniques, durations, and temperatures employed during its preparation. Different synthesis techniques known in the art, such as solid-state synthesis, sol-gel method, co-precipitation, hydrothermal synthesis, and combustion synthesis, can impact the purity and properties of LMO. For example, sol-gel methods typically involve the hydrolysis and condensation of precursor solutions to form a gel, followed by drying and calcination. Co-precipitation techniques involve the simultaneous precipitation of metal ions from solution, which can result in homogeneous mixing and fine particle-size distribution, potentially increasing the loading capacity of LMO.

In some embodiments of the present disclosure, the duration of the reaction, including time at temperature and variations in temperature, may affect the purity and potentially the spinel structure of the doped LMO. In some commercial applications, it may be advantageous to produce a higher purity of LMO in relation to the initial reactants in a shorter time period using more readily available Manganese compound sources, such as $Mn_3O_4$. Referring to FIG. 6, a table of reaction temperatures used during a constant reaction duration of five (5) hours is provided. Within the table, a precursor blend mass of twenty-five (25) grams composed of the reactants $LiOH \cdot H_2O$ and $Mn_3O_4$ mixed in a 3:4 molar ratio of lithium to manganese blend and an $Al(OH)_3$ doping agent with a 0.3% molar replacement of the aluminum for manganese is utilized.

FIG. 6 is a table that lists the compound constituents and percentages of each compound present in each of the intermediate-state sorbent blends. The table includes constituents present when doped and undoped precursor blends are calcined at various initial calcination temperatures for a duration of five (5) hours as described in the method for manufacturing a doped LMO sorbent spinel from FIG. 2, according to some embodiments of the present disclosure. The values for the compound constituents listed within FIG. 6 represent the weight-percent phase composition of each compound as determined by Rietveld refinement of XRD data. At 400° C., for a calcining duration of five (5) hours, 15.63% by weight of LMO, 0.76% by weight of $Mn_2O_3$, 81.66% by weight of $Mn_3O_4$, and 1.95% by weight of LiOH monohydrate as against the compound constituent percentages of undoped intermediate-state sorbents which are 11.51% by weight of LMO, 6.98% by weight of $Mn_2O_3$, 77.41% by weight of $Mn_3O_4$, and 4.11% by weight of LiOH monohydrate obtained under the same calcining temperature and duration. At 450° C., for a calcining duration of 5 hours, 11.26% of LMO, 14.2% of $Mn_2O_3$, and 74.54% of $Mn_3O_4$ are obtained (nearly or actually 0% $LiOH \cdot H_2O$ is obtained) as against the compound constituent percentages of undoped intermediate-state sorbents which are 7.08% by weight of LMO, 12.81% by weight of $Mn_2O_3$, 78.07% by weight of $Mn_3O_4$, and 2.04% by weight of LiOH monohydrate obtained under the same calcining temperature and duration. At 500° C., for a calcining duration of five (5) hours, 70.58 g of LMO, 2.33 g of $Mn_2O_3$, 26.41% of $Mn_3O_4$, and 0.68% of LiOH monohydrate are obtained as against the compound constituent percentages of undoped intermediate-state sorbents which are 90.62% by weight of LMO, 9.04% by weight of $Mn_2O_3$, and 0.34% by weight of $Mn_3O_4$ (nearly or actually 0% $LiOH \cdot H_2O$ is obtained), obtained under same calcining temperature and duration. At 525° C., for a calcining duration of five (5) hours, 88.79% of LMO, 10.78% $Mn_2O_3$ and 0.43% of LiOH monohydrate (nearly or actually 0% $Mn_3O_4$ is obtained) are obtained as against the compound constituent percentages of undoped intermediate-state sorbents which are 94.42% by weight of LMO and 5.58% by weight of $Mn_2O_3$ (nearly or actually 0% $Mn_3O_4$ and nearly or actually 0% $LiOH \cdot H_2O$ are obtained) obtained under same calcining temperature and duration. At 550° C., for a calcining duration of five (5) hours, 80.13 g of LMO, 19.37 g of $Mn_2O_3$ and 0.5% of LiOH monohydrate are obtained (nearly or actually 0% $Mn_3O_4$ is obtained) as against the compound constituent percentages of undoped intermediate-state sorbents which are 82.6% by weight of LMO and 17.4% by weight of $Mn_2O_3$, obtained (nearly or actually 0% $Mn_3O_4$ and nearly or actually 0% $LiOH \cdot H_2O$ are obtained) under the same calcining temperature and duration. At 600° C., for a calcining duration of five (5) hours, 88.04% by weight of LMO and 11.96% by weight of $Mn_2O_3$ are obtained (nearly or actually 0% $Mn_3O_4$ and nearly or actually 0% $LiOH \cdot H_2O$ are obtained) as against the compound constituent percentages of undoped intermediate-state sorbents which are 72.2% by weight of LMO, 23.98% by weight of $Mn_2O_3$, 2.21% by weight of $Mn_3O_4$, and 1.62% by weight of LiOH monohydrate obtained under the same calcining temperature and duration. At 650° C., for a calcining duration of five (5) hours, 89.78% by weight of LMO and 10.22% by weight of $Mn_2O_3$ are obtained (nearly or actually 0% $Mn_3O_4$ and nearly or actually 0% $LiOH \cdot H_2O$ are obtained) as against the compound constituent percentages of undoped intermediate-state sorbents which are 74.34% by weight of LMO and 25.66% by weight of $Mn_2O_3$, obtained (nearly or actually 0% $Mn_3O_4$ and nearly or actually 0% $LiOH \cdot H_2O$ are obtained) under the same calcining temperature and duration.

A reaction, regarding FIG. 6, is a calcination of a fixed five-hour (5-hour) duration on the doped precursor blend, that is performed at various temperatures between 400° C. and 650° C. At the end of each five-hour (5-hour) period, the calcining results in the formation of an intermediate-state sorbent blend of at least $Mn_2O_3$ and an LMO. The table suggests that as the calcination temperature increases, the reactants present in the doped precursor blend found within the doped intermediate-state sorbent decrease from their initial mass weights. In some embodiments, the presence of lithium hydroxide monohydrate ($LiOH \cdot H_2O$) facilitates the conversion of manganese (II, III) oxide ($Mn_3O_4$) to manganese (III) oxide ($Mn_2O_3$) and a lithium manganese oxide (LMO) through a reaction. Manganese (III) oxide ($Mn_2O_3$) may be produced as a byproduct of the reaction between lithium hydroxide and manganese (II, III) oxide. $Mn_2O_3$ may form as a separate phase or coexist with LMO depending on the synthesis conditions.

Improvement or optimization of the formation of a doped LMO and reduction of the reactants within a limited time frame may be improved or optimized within a window of calcination temperatures of approximately 525° C. and 650° C. The data suggests that when 100 grams of reactants are mixed in a 3:4 ratio, and at least 90 grams of LMO are desired, the doped precursor blend is doped with a doping agent in any one of a 3:4, a 4:5 or a 0.70-0.85 molar ratio of lithium to manganese with a 0.3% molar replacement of the doping agent for manganese, the formation of LMO may be improved or optimized by calcining between approximately 525° C. and 650° C. In some embodiments, it may be desired to produce a doped intermediate-state sorbent blend with negligible or unmeasurable amounts of reactants. When the purity of the LMO requires at least 80 grams of LMO and negligible or unmeasurable amounts of reactants, a five-hour (5-hour) calcination period from approximately 525° C. to approximately 550° C. may be preferred. In some embodiments, lithium manganese oxide ($Li_{1.33}Mn_{1.67}O_4$, $LiMn_2O_4$ or LMO) is the desired product of the reaction. LMO forms as a spinel phase by incorporating lithium ions into the manganese-oxide lattice.

FIG. 7 is a table illustrating the respective quantities of doped intermediate-state sorbent blend obtained at a calcining temperature of 525° C. at different time intervals during the first calcining duration as described in the method for manufacturing a doped LMO sorbent spinel from FIG. 2, according to some embodiments of the present disclosure. At 525° C., for 0.5 hours, 72.18% by weight of LMO, 1.42% by weight of $Mn_2O_3$ and 26.4% by weight of $Mn_3O_4$ are obtained (nearly or actually 0% by weight of $LiOH \cdot H_2O$ is obtained) in contrast to the compound constituent percentages of undoped intermediate-state sorbents which are 55.5% by weight of LMO, 7.04% by weight of $Mn_2O_3$, 37.19% by weight of $Mn_3O_4$, and 0.26% by weight of LiOH monohydrate obtained under the same calcining temperature and duration. At 525° C., for one (1) hour, 77.71% by weight of LMO, 13.27% by weight of $Mn_2O_3$, 7.87% by weight of $Mn_3O_4$, and 1.14% by weight of LiOH monohydrate are obtained as against the compound constituent percentages of undoped intermediate-state sorbents which are 69.02% by weight of LMO, 15.69% by weight of $Mn_2O_3$, 11.0% by weight of $Mn_3O_4$, and 4.3% by weight of LiOH monohydrate obtained under the same calcining temperature and duration. At 525° C., for two (2) hours, 86.4% by weight of LMO, 12.84% by weight of $Mn_2O_3$, 0.08% by weight of $Mn_3O_4$, and 0.68% by weight of LiOH monohydrate are obtained as against the compound constituent percentages of undoped intermediate-state sorbents which are 84.36% by weight of LMO and 15.64% by weight of $Mn_2O_3$, obtained (nearly or actually 0% $Mn_3O_4$ and nearly or actually 0% $LiOH \cdot H_2O$ are obtained) under the same calcining temperature and duration. At 525° C., for five (5) hours, 88.79% by weight of LMO and 10.78% by weight of $Mn_2O_3$ and 0.43% by weight of LiOH monohydrate are obtained (nearly or actually 0% $Mn_3O_4$ is obtained) in contrast with the compound constituent percentages of undoped intermediate-state sorbents which are 94.42% by weight of LMO and 5.58% by weight of $Mn_2O_3$, obtained (nearly or actually 0% $Mn_3O_4$ and nearly or actually 0% $LiOH \cdot H_2O$ are obtained)

under the same calcining temperature and duration. At 525° C., for eight (8) hours, 83.75% by weight of LMO, 15.91% by weight of $Mn_2O_3$, 0.03% by weight of $Mn_3O_4$, and 0.31% by weight of LiOH monohydrate are obtained in contrast with the compound constituent percentages of undoped intermediate-state sorbents which are 78.79% by weight of LMO, 20.66% by weight of $Mn_2O_3$, 0.08% by weight of $Mn_3O_4$, and 0.47% by weight of LiOH monohydrate obtained under the same calcining temperature and duration. At 525° C., for fifteen (15) hours, 92.22% by weight of LMO and 7.78% by weight of $Mn_2O_3$ are obtained (nearly or actually 0% $Mn_3O_4$ and nearly or actually 0% $LiOH \cdot H_2O$ are obtained) in contrast with the compound constituent percentages of undoped intermediate-state sorbents which are 83.54% by weight of LMO and 16.46% by weight of $Mn_2O_3$, obtained (nearly or actually 0% $Mn_3O_4$ and nearly or actually 0% $LiOH \cdot H_2O$ are obtained) under the same calcining temperature and duration. The calcination duration for $Mn_2O_3$ is about fifteen (15) hours at 525° C. to ensure conversion to 92% of LMO through dehydration while reducing or minimizing impurities and phase transformations.

FIG. 8 is a table illustrating the compound constituent percentages of the sorbents of calcined doped and undoped precursor blend during second calcination temperatures and durations, as described in the method for manufacturing a doped LMO sorbent spinel from FIG. 5, according to some embodiments of the present disclosure. At 400° C., for an initial calcining duration of five (5) hours and a second calcining duration of ten (10) hours at 525° C., 52.66% by weight of LMO, 46.35% by weight of $Mn_2O_3$, 0.33% by weight of $Mn_2O_3$, and 0.66% by weight of LiOH monohydrate are obtained in contrast with the compound constituent percentages of undoped intermediate-state sorbents which are 76.59% by weight of LMO and 23.41% by weight of $Mn_2O_3$, obtained (nearly or actually 0% $Mn_3O_4$ and nearly or actually 0% $LiOH \cdot H_2O$ are obtained) under the same calcining temperature and duration. At 525° C., for an initial calcining duration of 0.5 hours and a second calcining duration of 0.5 hours at the same temperature, 85.39% by weight of LMO, 7.93% by weight of $Mn_2O_3$, 4.58% by weight of $Mn_2O_3$ and 2.09% by weight of LiOH monohydrate are obtained in contrast with the compound constituent percentages of undoped intermediate-state sorbents which are 63.32% by weight of LMO, 25.68% by weight of $Mn_2O_3$, 10.37% by weight of $Mn_3O_4$, and 0.64% by weight of LiOH monohydrate obtained under the same calcining temperature and duration. At 525° C., for an initial calcining duration of 0.5 hours and a second calcining duration of ten (10) hours at the same temperature, 100.0% by weight of LMO, is obtained (nearly or actually 0% $Mn_2O_3$, nearly or actually 0% $Mn_3O_4$, and nearly or actually 0% $LiOH \cdot H_2O$ are obtained) in contrast with the compound constituents of undoped intermediate-state sorbents which are 83.24% by weight of LMO, 16.67% by weight of $Mn_2O_3$, 0.06% by weight of $Mn_3O_4$, and 0.02% by weight of LiOH monohydrate obtained under same calcining temperature and duration. At 525° C., for an initial calcining duration of two (2) hours and a second calcining duration of two (2) hours at the same temperature, 92.29% by weight of LMO, 7.04% by weight of $Mn_2O_3$, and 0.67% by weight of $Mn_2O_3$ is obtained (nearly or actually 0% $LiOH \cdot H_2O$ is obtained) in contrast with the compound constituents of undoped intermediate-state sorbents which are 79.89% by weight of LMO, 19.42% by weight of $Mn_2O_3$, 0.49% by weight of $Mn_3O_4$, and 0.21% by weight of LiOH monohydrate obtained under same calcining temperature and duration.

At 525° C., for an initial calcining duration of two (2) hours and a second calcining duration of ten (10) hours at the same temperature, 100.0% by weight of LMO is obtained (nearly or actually 0% $Mn_2O_3$, nearly or actually 0% $Mn_3O_4$, and nearly or actually 0% $LiOH \cdot H_2O$ are obtained) in contrast with the compound constituents of undoped intermediate-state sorbents which are 89.82% by weight of LMO, 8.92% by weight of $Mn_2O_3$ and 1.26% by weight of $Mn_3O_4$ are obtained (nearly or actually 0% $LiOH \cdot H_2O$ is obtained) under the same calcining temperature and duration. At 525° C., for an initial calcining duration of five (5) hours and a second calcining duration of ten (10) hours at the same temperature, 95.43% by weight of LMO, 3.31% by weight of $Mn_2O_3$, 0.94% by weight of $Mn_2O_3$ and 0.33% by weight of LiOH monohydrate are obtained in contrast with the compound constituents of undoped intermediate-state sorbents which are 91.38% by weight of LMO, 8.09% by weight of $Mn_2O_3$, and 0.53% by weight of LiOH monohydrate obtained (nearly or actually 0% $Mn_3O_4$ is obtained) under the same calcining temperature and duration. At 525° C., for an initial calcining duration of fifteen (15) hours and a second calcining duration of ten (10) hours at the same temperature, 99.48% by weight of LMO, 0.2% by weight of $Mn_2O_3$, and 0.31% by weight of LiOH monohydrate are obtained (nearly or actually 0% $Mn_3O_4$ is obtained) in contrast with the compound constituents of undoped intermediate-state sorbents which are 92.23% by weight of LMO, 7.16% by weight of $Mn_2O_3$, 0.33% by weight of $Mn_3O_4$, and 0.28% by weight of LiOH monohydrate obtained under the same calcining temperature and duration. At 650° C., for an initial calcining duration of five (5) hours and a second calcining duration of ten (10) hours for the same temperature, 99.33% by weight of LMO, 0.42% by weight of $Mn_2O_3$ and 0.25% by weight of LiOH monohydrate are obtained (nearly or actually 0% $Mn_3O_4$ is obtained) in contrast with the compound constituents of undoped intermediate-state sorbents which are 92.09% by weight of LMO, 7.76% by weight of $Mn_2O_3$ and 0.15% by weight of LiOH monohydrate are obtained (nearly or actually 0% $Mn_3O_4$ is obtained).

In some embodiments, the first calcining step may not synthesize a pure LMO. By varying the duration of the reaction and/or temperature, some or all of the reactants may be eliminated from the doped blend. The presence of the reactants from the doped precursor blend, and some doped intermediate products, such as $Mn_2O_3$, are formed during synthesis. A second calcination step may be performed to further reduce the presence of the constituents of the doped intermediate-state sorbent other than the doped LMO spinel, leading to higher-purity doped LMO. In some embodiments, doped-LMO spinel formation may involve multiple reaction steps forming a doped intermediate-state sorbent blend of intermediates not present in the doped precursor blend, for example $Mn_2O_3$. In some embodiments, a first calcination at 525° C. for five (5) hours may not result in the desired phase-formation or crystal-structure improvement or optimization of the LMO. A second calcination step at 525° C. for ten (10) hours allows for further phase transformation and crystallization leading to the formation of the desired doped-LMO spinel phase with an improved or the optimal crystal structure and loading capacity.

In yet another embodiment, the second calcination step can promote better mixing and homogenization of the doped precursor materials, facilitating or ensuring uniform distribution of lithium, manganese, and oxygen throughout the doped LMO particles.

FIG. 9 is a table illustrating the comparison of loading capacities of doped and undoped sorbent blend after initial and second calcinations and durations as described in the method for manufacturing a doped LMO sorbent spinel from FIG. 5, according to some embodiments of the present disclosure. At 525° C., for 0.5 hours of an initial calcining duration and a second calcining duration of 0.5 hours, the loading capacity of doped sorbent obtained is 13.3 mg/g of activated LMO in contrast with an undoped sorbent with loading capacity of 10.2 mg/g of activated LMO when LiOH was used as a precursor and a high-grade $Mn_3O_4$ source was used. At 525° C., for two (2) hours of an initial calcining duration and a second calcining duration of two (2) hours, the loading capacity of doped sorbent obtained is 16.2 mg/g of activated LMO in contrast with an undoped sorbent with loading capacity of 13.2 mg/g of activated LMO when LiOH was used as a precursor and a high-grade $Mn_3O_4$ source was used. At 525° C., for five (5) hours of an initial calcining duration and a second calcining duration of ten (10) hours, the loading capacity of doped sorbent obtained is 18.6 mg/g of activated LMO in contrast with an undoped sorbent with loading capacity of 15.9 mg/g of activated LMO when LiOH was used as a precursor and a high-grade $Mn_3O_4$ source as used. At 525° C., for fifteen (15) hours of an initial calcining duration and a second calcining duration of ten (10) hours, the loading capacity of doped sorbent obtained is 19.8 mg/g of activated LMO as against undoped sorbent with loading capacity of 14.5 mg/g of activated LMO when LiOH was used as a precursor and a high-grade $Mn_3O_4$ source was used. At 525° C., for five (5) hours of an initial calcining duration and a second calcining duration of ten (10) hours, the loading capacity of doped sorbent obtained is 24.1 mg/g of activated LMO as against undoped sorbent with loading capacity of 23.9 mg/g of activated LMO when $Li_2CO_3$ was used as a precursor and a high-grade $Mn_3O_4$ source was used.

Purity can influence the crystal structure and morphology of doped LMO spinel. Forming a doped intermediate-state sorbent blend may lead to the formation of secondary phases or alter the stoichiometry of the LMO lattice structure. Changes in crystal structure can affect the accessibility of lithium ions within the material, potentially impacting loading capacity. FIG. 9 data suggests that the purity of the LMO spinel was maximized between five (5) and fifteen (15) hours at 525° C. during the second calcination.

FIG. 9 is a table illustrating the loading capacity of doped LMO sorbent spinel as described in the method of manufacturing a doped LMO spinel from FIG. 5, according to some embodiments of the present disclosure. The table contents represent the impact temperature, duration of the reacting step, reactants, and a second reacting step have on the loading capacity of the resulting LMO. By varying each of the duration temperatures, duration of the reacting step, reactants, and a second reacting step, different amounts of LMO, intermediate compound, and reactants present within the doped precursor blend can be biased to preferred amounts. In particular, the duration and temperature of the reacting, in this exemplary instance, calcining can be modified in a second calcining event of duration and temperature to achieve a desired loading capacity. It is also pertinent to note that doping the doped precursor blend enhances the loading capacity of the resultant sorbent blend.

Referring to FIG. 9, experiments No. 1-4 were conducted using a doped precursor blend of LiOH monohydrate and a high-grade $Mn_3O_4$ source, while experiment No. 5 was conducted using a doped precursor blend of lithium carbonate ($Li_2CO_3$) and a high-grade $Mn_3O_4$ source. Typical of a higher-grade $Mn_3O_4$ source, the high-grade $Mn_3O_4$ source comprised a lower volume of iron (e.g., percent by weight of less than 0.7), an availability of Mn in % by weight equal to or greater than 71% of overall weight. The process of doping involves substituting small amounts of elements (e.g., Al, Ni, or other elements) for Mn, Co, or Ni in the LMO structure. Doping aids in improving the structural stability and performance of LMO, particularly during phase transitions. The process is attributed to strong Al—O bonds that facilitate adsorption or desorption, thereby enhancing the structural stability of LMO. In general, calcining temperatures of approximately 525° C. synthesized an LMO (e.g., a spinel LMO compound chemical formula best matches $Li_{1.33}Mn_{1.67}O_4$ as determined using XRD), yielding higher loading capacities, while a second calcination generally increases the loading capacity of the activated LMO (e.g., an HMO) at the end of the second calcination event. Milling was performed between the initial and second calcinations.

TABLE 2

| Ion Concentrations in the Synthetic Brine Solution | | | | | |
|---|---|---|---|---|---|
| Ion | Li+ | Na+ | K+ | Cl− | HCO3− |
| Concentration (mg/L) | 13 | 55 | 787 | 780 | 145 |

The loading capacity was measured after the initial calcination and again after an extended second calcination period of ten (10) hours. A loading test was performed on the activated sorbent (e.g., an HMO) using a synthetic brine. The brine solution is defined in Table 2. Loading tests were conducted with 200 mL of brine solution and approximately (or actually) 0.1 g of activated sorbent. Approximately generally refers to measurements that are within the tolerance of the measuring equipment, or the measurement is within a +/−5% of the stated value, whichever is greater. This ratio is intended to supply an excess of lithium, allowing an accurate determination of the loading capacity. Samples were mixed for approximately one hour before collecting the depleted brine samples. Various other methodologies for assessing the absorption of the doped sorbent can be used to assess the loading capacity of a sorbent. It should be acknowledged that the constituents of the testing brine may influence the loading capacities determined through these tests. Components such as competing ions, pH levels, and the presence of organic compounds or other metals within the brine solution can significantly impact the sorbent's lithium uptake. These interactions may lead to reduced loading capacities, highlighting the importance of considering the specific composition of the brine when evaluating sorbent performance. Additionally, the testing conditions, such as the contact time between the doped sorbent and the brine, temperature, and sorbent-to-brine ratio, are critical factors that can affect the outcome of the loading capacity tests. As such, improving or optimizing these parameters based on the characteristics of the doped sorbent and the brine solution can be essential for accurately determining loading capacity, increasing the likelihood, or ensuring that the findings are representative of real-world applications.

As described in FIG. 9, the highest loading capacity of 24.1 mg/g lithium in activated LMO is achieved by calcining for five (5) hours during the first calcination, followed by another ten-hour (10-hour) calcination during the second firing period at 525° C., when $Li_2CO_3$ was used as a precursor and a high-grade $Mn_3O_4$ source was used. The data presented in the table of FIG. 9 further signifies that none of the other firing combinations yield a higher loading capacity of activated LMO.

The formation of doped LMO spinel at rather high purities, e.g., above 90% purity by weight, can be accomplished by calcining reactants like $Mn_3O_4$ and LiOH monohydrate at a lower temperature for relatively brief durations of five (5) hours. This synthesis technique allows a commercially available manganese compound to be chemically converted to an intermediate compound, like $Mn_2O_3$. In some experiments, the formation of the intermediate $Mn_2O_3$ compound in the presence of a doped precursor blend of $Mn_3O_4$ and LiOH monohydrate may facilitate the formation of the doped LMO spinel. Achieving a volume of $Mn_2O_3$ compound, and calcining produces doped spinel sorbent within a relatively short duration of five (5) hours at purities that are achieved at lab quantities in one-third the time. The present technique suggests this method of utilizing an available compound, converting the compound in the presence of a doped precursor blends is feasible and effective for synthesizing a doped spinel sorbent.

In a preferred embodiment, calcining the doped precursor blend at 525° C. for five (5) hours in an ambient atmosphere may form LMO via a one-step, cost-effective and scalable method of synthesis of a doped LMO spinel. Referring to FIG. 5, in some embodiments, steps of the method may include 510 to 560. At 510, the doped precursor blend may be a 0.70 to 0.85 ratio of lithium-to-manganese blend. Step 520 comprises reacting the doped precursor blend with a doping agent in a 0.70 to 0.85 ratio of lithium-to-manganese blend with a 0.3% molar replacement of the doping agent for manganese. At step 530, calcining the doped precursor blend of step 520 for an initial doped intermediate-state sorbent blend of at least $Mn_2O_3$ and a doped LMO. In the subsequent step 540, the resultant doped intermediate sorbent is milled to achieve particle-size reduction and homogenization. At step 550, the milled intermediate sorbent of step 540, is subjected to calcination for the second time for a second duration and temperature thereby forming a doped sorbent blend. The resultant sorbent blend of step 550 undergoes activation with an acid at step 560, wherein the doped sorbent is activated to reach an activation percentage of at least 65% activation to form an activated LMO sorbent. The doped LMO may have a lithium loading capacity of at least 19.8 mg/g of activated doped LMO at standard temperature and pressure. The activated sorbent blend comprises at least one species of doped HMO sorbent spinel.

In some embodiments, the doped intermediate-state sorbent blend of at least $Mn_2O_3$ and an LMO may further comprise at least 7.0% by weight $Mn_2O_3$ at least 4.0% by weight $Mn_3O_4$, at least 2% by weight of LiOH monohydrate, and 85% by weight LMO. In some embodiments, the doped sorbent may blend further comprise 99% by weight LMO, less than 1% by weight of $Mn_2O_3$ and less than 10% by weight of LiOH monohydrate. The doped activated sorbent blend comprises at least one species of doped HMO sorbent spinel having a lithium loading capacity of at least 19.8 mg/g of HMO may sorbent spinel.

In some embodiments, the milling step as described in FIG. 2 during LMO synthesis can reduce the presence of undesired products and increase the weight percent of LMO in the sorbent blend, as well as improve loading capacity. Additionally, improvement or optimization of synthesis parameters such as temperature, calcination duration, and precursor ratios can influence the crystal structure and morphology of LMO spinel obtained, thereby affecting loading capacity.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those having ordinary skill in the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal-bearing medium used to actually carry out the distribution. Examples of a signal-bearing medium include, but are not limited to, the following: a recordable-type medium such as a USB drive, a solid-state memory device, a hard-disk drive, a Compact Disc (CD), a Digital Video Disk (DVD), a digital tape, a computer memory, etc.; and a transmission-type medium such as a digital and/or an analog communication medium (e.g., a fiber optic cable, a waveguide, a wired communications link, a wireless communication link (e.g., transmitter, receiver, transmission logic, reception logic), etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application-specific integrated circuit, electrical circuitry forming a general-purpose computing device configured by a computer program (e.g., a general-purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read-only)), and/or electrical circuitry forming a communications device (e.g., a modem, communications switch, optical-electrical equipment). Those having ordinary skill in the art will recognize that the subject matter described herein may be implemented in an analog or digital fashion or some combination thereof.

Those skilled in the art will recognize that at least a portion of the devices and/or processes described herein can be integrated into a data-processing system. Those having ordinary skill in the art will recognize that a data-processing system generally includes one or more of a system-unit housing, a video-display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna), and/or control systems including feedback loops and control motors (e.g., feedback for sensing position and/or velocity; control motors for moving and/or adjusting components and/or quantities). A data-processing system may be implemented utilizing suitable commercially available components, such as those typically found in data-computing/communication and/or network-computing/communication systems.

In certain cases, use of a system or method as disclosed and claimed herein may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory.

Further, implementation of at least part of a system for performing a method in one territory does not preclude use of the system in another territory.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

One skilled in the art will recognize that the herein described components (e.g., operations), devices, objects, and the discussion accompanying them are used as examples for the sake of conceptual clarity and that various configuration modifications are contemplated. Consequently, as used herein, the specific examples set forth and the accompanying discussion are intended to be representative of their more general classes. In general, use of any specific example is intended to be representative of its class, and the non-inclusion of specific components (e.g., operations), devices, and objects should not be taken to be limiting.

With respect to the use of substantially any plural and/or singular terms herein, those having ordinary skill in the art can translate from the plural to the singular or from the singular to the plural as is appropriate to the context or application. The various singular/plural permutations are not expressly set forth herein for sake of clarity.

The herein described subject matter sometimes illustrates different components contained within, or connected with, different other components. It is to be understood that such depicted architectures are presented merely as examples, and that in fact many other architectures may be implemented which achieve the same functionality. In a conceptual sense, any arrangement of components to achieve the same functionality is effectively "associated" such that the desired functionality is achieved. Therefore, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of "operably couplable" include, but are not limited to, physically mateable or physically interacting components, wirelessly interactable components, wirelessly interacting components, logically interacting components, or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components, inactive-state components, or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and, in the absence of such recitation, no such intent is present. For example, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such a recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having ordinary skill in the art would understand the convention (e.g., "a system having at least one of A, B, and C" would include but not be limited to systems that have A alone, B alone, C alone, A and B together, A and C together, B and C together, and/or A, B, and C together). In those instances where a convention analogous to "at least one of A, B, or C, etc." is used, in general such a construction is intended in the sense one having ordinary skill in the art would understand the convention (e.g., "a system having at least one of A, B, or C" would include but not be limited to systems that have A alone, B alone, C alone, A and B together, A and C together, B and C together, and/or A, B, and C together). It will be further understood by those within the art that typically a disjunctive word or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented as sequences of operations, it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for manufacturing a doped LMO sorbent spinel, the method comprising steps of:
   a. providing a doped precursor blend, wherein the doped precursor blend is a 3:4 molar ratio of lithium to manganese, wherein the lithium source is LiOH monohydrate or $Li_2CO_3$ and the manganese source is a $Mn_3O_4$ blend with a 0.3% molar replacement of a doping agent for manganese;
   b. calcining the doped precursor blend for an initial calcining duration and at a first calcining temperature of at least 500° C., wherein the calcining forms a doped intermediate-state sorbent blend of at least $Mn_2O_3$ and a doped LMO; and
   c. calcining the doped intermediate-state sorbent blend for a second calcining duration and a second calcining temperature thereby forming a doped sorbent blend.

2. The method of claim 1, wherein the initial calcining duration is at least 0.5 hours and the first calcining temperature is at least 525° C., wherein the formed doped intermediate-state sorbent blend further comprises at least 70% by weight doped LMO, less than 2% by weight $Mn_2O_3$ and less than 27% of $Mn_3O_4$; and the second calcining duration is approximately thirty (30) minutes and the second calcining temperature is approximately 525° C., wherein the doped sorbent blend further comprises at least 85% by weight of doped LMO, less than 8.0% by weight $Mn_2O_3$, less than 5.0% by weight $Mn_3O_4$, and less than 3.0% of LiOH monohydrate, wherein the LMO has a lithium loading capacity of at least 13.3 mg/g of activated LMO.

3. The method of claim 1, wherein the initial calcining duration is at least two (2) hours.

4. The method of claim 1, wherein the doped intermediate-state sorbent blend further comprises greater than 1% by weight $Mn_3O_4$, less than 13% by weight $Mn_2O_3$, and at least 86% by weight LMO.

5. The method of claim 1, wherein the second calcining duration is at least two (2) hours, and the second calcining temperature is at least 525° C., wherein the doped sorbent blend further comprises less than 1% by weight $Mn_3O_4$, less than 8% by weight $Mn_2O_3$, and at least 92% by weight LMO, wherein the LMO has a lithium loading capacity of at least 16.0 mg/g of activated LMO.

6. The method of claim 1, wherein the initial calcining duration is at least five (5) hours and the first calcining temperature is at least 525° C., wherein the formed doped intermediate-state sorbent blend further comprises at least 75% by weight LMO and at least 5.5% by weight $Mn_2O_3$; and the second calcining duration is at least five (5) hours and the second calcining temperature is approximately 525° C., wherein the doped sorbent blend further comprises less than 1.0% by weight $Mn_3O_4$, less than 4% by weight $Mn_2O_3$, and at least 95% by weight LMO, wherein the LMO has a lithium loading capacity of at least 18.0 mg/g of activated LMO.

7. The method of claim 6, further comprising activating the doped sorbent blend, the activating comprising:
   a. mixing the doped sorbent blend with an acid;
   b. agitating the doped sorbent blend and the acid; and
   c. activating the doped sorbent blend to reach an activation percentage of at least 65% activation to form an activated doped sorbent blend.

8. The method of claim 1, wherein the doping agent is at least one of $Al(OH)_3$, $LiAlH_4$ $Co_3O_4$, $Cr_2O_3$, $Cr(OH)_3$, $Fe_2O_3$, $Fe_3O_4$, $Ni_2O_3$, $Ni(OH)_2$, NaCl, $AlCl_3$, $MgCO_3$, $Na_2CO_3$, NaOH, or $NaHCO_3$.

9. A method for manufacturing doped activated LMO sorbent spinel, the method comprising steps of:
   a. providing a doped precursor blend, wherein the doped precursor blend is a 0.70 to 0.85 molar ratio of lithium to manganese, wherein the lithium source is LiOH monohydrate or $Li_2CO_3$ and the manganese source is a $Mn_3O_4$ blend with a 0.3% molar replacement of a doping agent for manganese;
   b. calcining the doped precursor blend for an initial calcining duration and at a first temperature of at least 525° C., wherein the calcining forms a doped intermediate-state sorbent blend of at least $Mn_2O_3$ and a doped LMO;
   c. cooling the doped intermediate-state sorbent blend; and
   d. calcining the cooled doped intermediate-state sorbent blend for a second calcining duration of at least five (5) hours and a second calcining temperature of at least 500° C. forming a doped sorbent blend.

10. The method of claim 9, wherein the doped intermediate-state sorbent blend comprises less than 18% by weight $Mn_2O_3$, and at least 75% by weight LMO, wherein the LMO has a lithium loading capacity of at least 13.0 mg/g of activated doped LMO.

11. The method of claim 10, further comprising activating the doped sorbent blend with an acid, wherein the activated doped sorbent blend comprises at least one species of doped HMO sorbent spinel.

12. The method of claim 9, wherein the doping agent is at least one of $Al(OH)_3$, $LiAlH_4$, $Co_3O_4$, $Cr_2O_3$, $Cr(OH)_3$, $Fe_2O_3$, $Fe_3O_4$, $Ni_2O_3$, $Ni(OH)_2$, $NaCl$, $AlCl_3$, $MgCO_3$, $Na_2CO_3$, $NaOH$, or $NaHCO_3$.

* * * * *